United States Patent [19]

Piroska

[11] Patent Number: 5,466,108
[45] Date of Patent: Nov. 14, 1995

[54] PROCESS AND APPARATUS FOR FEEDING FRAGMENTED MATERIAL INTO A CONTAINER UNDER PRESSURE

[75] Inventor: Jozseff Piroska, Järfälla, Sweden

[73] Assignee: Vattenfall Energisystem AB, Vallingby, Sweden

[21] Appl. No.: 244,585

[22] PCT Filed: Nov. 26, 1992

[86] PCT No.: PCT/SE92/00818

§ 371 Date: Jun. 3, 1994

§ 102(e) Date: Jun. 3, 1994

[87] PCT Pub. No.: WO/93/10893

PCT Pub. Date: Jun. 10, 1994

[30] Foreign Application Priority Data

Dec. 5, 1991 [SE] Sweden ............... 9103622-8

[51] Int. Cl.⁶ ............................................. B01J 3/02
[52] U.S. Cl. ......................... 414/218; 100/148; 100/249; 414/786
[58] Field of Search .................... 414/218, 326, 414/197, 198, 213, 786; 198/671; 100/144, 145, 148, 190, 220, 249, 904; 110/109, 110, 289

[56] References Cited

U.S. PATENT DOCUMENTS

| | | | |
|---|---|---|---|
| 532,750 | 1/1895 | Banister et al. | 100/220 |
| 2,067,583 | 1/1937 | Stark | 110/289 |
| 2,228,840 | 1/1941 | Mittendorf | 110/109 X |
| 2,411,971 | 12/1946 | MacMillin et al. | 100/145 X |
| 2,541,742 | 2/1951 | Booth | 100/145 X |
| 2,696,442 | 12/1954 | Allbright | 100/220 X |
| 2,765,899 | 10/1956 | Ballard | 414/326 |
| 3,756,434 | 9/1973 | Teske | 414/218 |
| 3,934,038 | 1/1976 | Kerr | 100/249 X |
| 4,119,025 | 10/1978 | Brown | 100/145 X |

FOREIGN PATENT DOCUMENTS

| | | | |
|---|---|---|---|
| 0219686 | 9/1986 | European Pat. Off. | |
| 2842471 | 10/1979 | Germany | 414/218 |
| 15620 | 1/1901 | Sweden | |
| 456645 | 8/1984 | Sweden | |

*Primary Examiner*—David A. Bucci
*Attorney, Agent, or Firm*—Rolf Fasth

[57] ABSTRACT

Disintegrated material is supplied to a pressure chamber by a rotatable and axially translatable screw piston. The piston is rotated while in a first axial position to transport and compact the material in a receiving chamber against a closed output valve in front of the piston. The output valve is opened and the compacted material is moved into the pressure chamber by axial non-rotative motion of the piston. The output valve then is closed, and the piston is axially returned to its first axial position while rotating in the same direction as before. The operation cycle is repeated as above. An apparatus for carrying out a process comprises an axially movable guide piston rotationally carrying and guiding the screw piston for rotation and axial movement by action of a hydraulic cylinder and a mechanism for rotationally positioning the screw piston.

12 Claims, 1 Drawing Sheet

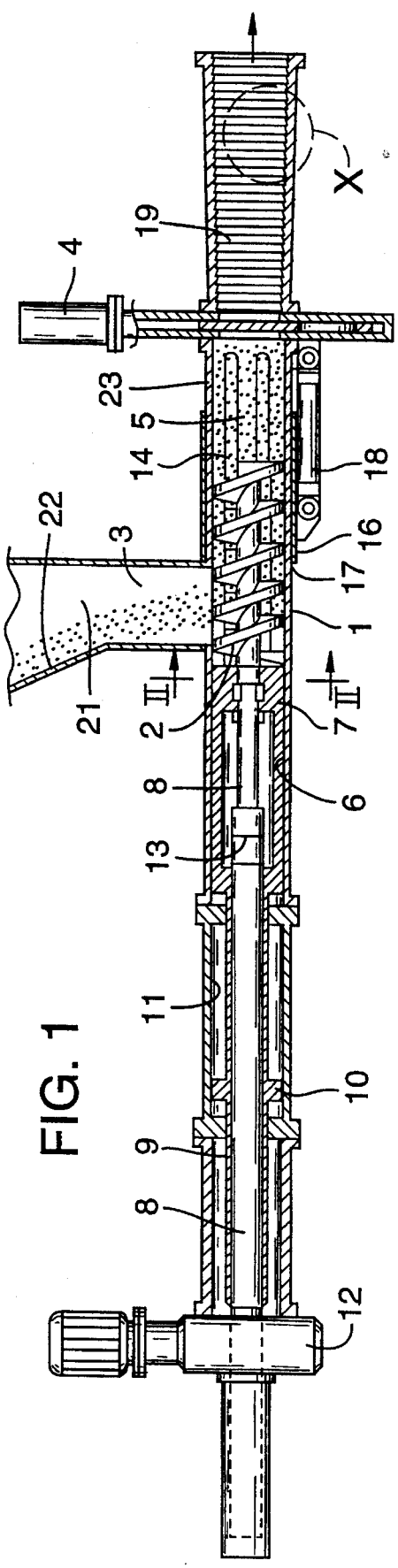
FIG. 1
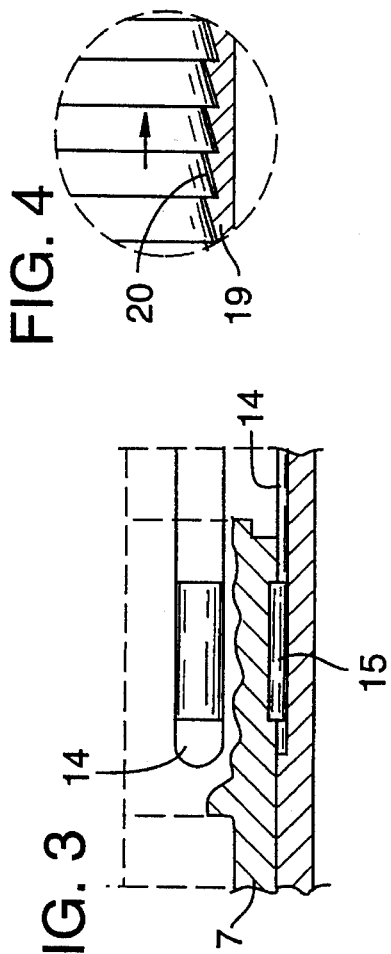
FIG. 4
FIG. 3
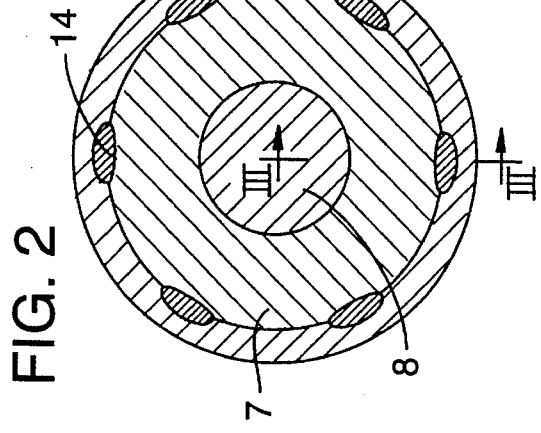
FIG. 2

PROCESS AND APPARATUS FOR FEEDING FRAGMENTED MATERIAL INTO A CONTAINER UNDER PRESSURE

FIELD OF THE INVENTION

The present invention relates to a method and an apparatus for feeding disintegrated material such as wood chips and the like into a collecting container under pressure, the material being transported in a pulsing flow from a charging bin through an input valve to a cylindrical input chamber, the material being discharged axially from this chamber to the collecting container through an output valve by means of a feeding piston.

BACKGROUND AND SUMMARY OF THE INVENTION

Various feeding devices for grainy or fragmented material are known, the material being fed in for further treatment without any great increase of pressure, or for further treatment under an essentially increased pressure. An example of the first mentioned treatment is feeding fuel into a fludized bed as described in the publication EP-Al-0219686. In this case the fuel is fed in from a charging bin by means of a first plane slide which moves the fuel from the charge bin laterally to a position in front of a cylindrical input slide. Finally, said last mentioned slide feeds the fuel through an opened side gate into the fuel chamber. The fuel is fed into the fuel chamber without any actual overpressure.

In order to feed disintergrated material against a comparatively high pressure for further treatment of the material, as for example gasifying, some form of lock-passing or sluicing is exercised when feeding in. The publication SE-B-456 645 examplifies such an apparatus. In this case the material is supplied for treatment from a charging bin to a first receiving chamber and is removed therefrom, by means of a feed piston or a feed screw, and introduced into the input chamber proper through a valve device. By means of a feeder piston in the input chamber the material is introduced into a following high pressure chamber through a further valve. The two valves cooperate in order to bring about sluicing of the material into the high pressure side. The final feeding into the high pressure chamber takes place by means of said piston. The device is especially directed towards input sluicing of wet bio mass, such as e.g. damp peat having up to 20% dry substance, into a high pressure reactor operating at a pressure of up to 150 bar and a temperature of 350° C. In order to ensure complete discharge of the peat from the actual input chamber (sluice chamber) into the reactor on the high pressure side the feed piston is moved past the closing member of the output valve. This known device operates by in-feed in two steps, namely, a first feeding in from the receiving chamber to the actual input chamber and a following final in-feed step from this chamber against the action of high pressure. Said last mentioned in-feed step is exercised by means of a conventional feed piston.

The present invention is directed in particular towards the in-feed of wood ships and similar comparatively dry compactible material. To this end the possibility is utilized to receive and compact the material in one single operating chamber and to discharge the material therefrom into a collecting container under pressure by means of a single active member in the form of a screw piston moving under programmed control. The in-feed process according to the invention is then characterized by a series of operational steps according to the following:

a) the material is supplied to the input chamber through the opened input valve by means of a feeding piston axially movable in the input chamber, the feeding piston having the form of a screw piston which is located in an axially retracted, receiving position, opposite to the input valve, and which feeds, while rotating in an axially stationary position, the material into the chamber towards the closed output valve, b) material is formed as a compacted plug in the exit end of the chamber in front of the closed output valve, c) the input valve is closed and the rotation of the screw piston terminated, d) the output valve is opened and the material plug formed is pushed, by the screw piston being moved axially, into the collecting container through a slightly expanding pressure tube whose internal wall has serrations serving to prevent return movement of the plug, e) the screw piston is retracted a short distance to permit the output valve to close, f) the output valve is closed and the screw piston is pulled back to its starting position while rotating in the same direction as when feeding in material and in correspondence to the pitch of the screw piston, and g) the input valve is opened.

The in-feed procedure according to the invention has the advantage that the constructive design of the corresponding apparatus is highly simplified, in that only three operatively active parts are necessary for handling the material, namely, an input valve, a screw piston and an output valve. Hereby the in-feed device is highly simplified. The desired translatory displacement of the material is secured by the feature that during the in-feed procedure the screw piston is at first merely rotated for transporting axially the material into the chamber in order to build up a compacted material plug in front of the screw piston, to then be moved axially without rotation in order to discharge the material plug thus formed in front of the screw piston and, finally, to return to its starting position while rotating in the same direction. In other words, unnessary and power consuming rotation of the material in the chamber is avoided.

The arrangement of a single screw piston for transporting and compacting the treated material renders a simple and rational build-up of the whole apparatus possible, including the requested member for axially displacing the screw piston along a single common axis. To perform this the screw piston is carried for rotation and axial displacement in a guide piston which is slideably carried in an elongated part of the input chamber. The guide piston is displaced axially by means of a hydraulic cylinder connected to the elongated part of the input chamber, the rotational shaft of the screw piston extending axially through a tubular, guide piston-connected piston rod of the hydraulic cylinder, said shaft being connected at its free end to a device for controlling the rotational position of the screw piston.

The guide piston is provided with guide keys engaging axial groves in the internal wall of the input chamber. Besides its primary function of preventing rotation of the guide piston the grooves also serve for preventing rotation of the treated material under the action of the screw piston while this is rotating.

The compacted material plug discharged is forwarded to a collecting container through a slightly expanding pressure tube having a serrated internal profile. The tube allows the compacted material plug to undergo a certain elastic relaxation and prevents the plug, thanks to its uni-directed saw-teeth, from being returned towards the input chamber by possible pressure effect on the output side.

The invention will be described below by way of example and with reference to the accompanying drawing which illustrates an apparatus according to the invention:

BRIEF DESCRIPTION OF THE DRAWINGS

FIG. 1 shows a feeding device according to the invention in longitudinal cross section;

FIG. 2 is a cross section on a larger scale along line II—II in FIG. 1;

FIG. 3 is a partial cross section along line III—III in FIG. 2 with central portions removed; and FIG. 4 shows a portion X of FIG. 1 on a larger scale.

DESCRIPTION OF PREFERRED EMBODIMENTS

The feeding device according to FIG. 1 comprises a charging bin 21 for grainy or disintegrated material 22, such as wood chips. The charging bin opens through an inlet 3 into a cylindrical input chamber 1. This inlet 3 can be closed by means of a cylinder valve 16 which is axially slideable and carried on and about the cylindrical input chamber, the valve being axially displaceable by means of a hydraulic cylinder 18. The cylinder valve 16 has its forward closing edge 17 formed as a knife edge to facilitate cutting through the material 22 when the cylinder valve is closed.

In the cylinder chamber 1 there is a screw piston 2. This screw piston has a central core surrounded by a screw thread of pitch s. The screw piston 2 is adapted to the input chamber 1 so as to have a suitably adjusted radial play there, e.g. in the range of 2–10 mm. The central core of the screw piston extends axially rearwards in the form of a drive shaft 8 which is divided into two sections interconnected by way of a shaft coupling 13. At its outer free end the drive shaft 8 is connected, non-rotably but axially displaceable (e.g. by a spline joint), to a drive mechanism 12 for rotating the drive shaft with its screw piston 2. This driving device serves, by rotating the screw piston 2, to move the charge material 22 in the direction towards the exit end of the chamber 1, which is then maintained closed by means of an output valve 4 in the form of a slide gate. In the process the material is collected and compacted in a receiving space 5 at the exit end of the chamber 1.

The drive shaft 8 is rotatably carried in a guide piston 7 in order to be moved axially together with the screw piston. The guide piston is cylindrical and slideably carried for axial movement in a cylindrical guide way 6 forming an elongated part of the cylindrical input chamber 1. At its rear end, remote from the screw piston 2, the guide piston is provided with an axial extension 9 forming the piston rod of a hydraulic cylinder 11 with its pressure piston 10. The piston rod 9 is tubular and the drive shaft 8 extends freely through the extension 9 of the guide piston, coaxial therewith. By means of the hydraulic cylinder 11 the guide piston 7 can be displaced axially with the screw piston 2 while this piston is either rotating or not rotating. In its axially retracted position according to FIG. 1 the screw piston can thus be either solely rotated for transporting material to the receiving space 5 or solely displaced axially without rotation, to transport axially the compacted material out of the receiving space 5 and, in doing so, operating as a conventional piston. Finally, after said last mentioned axial displacement the screw piston can return to its initial position while simultaneously rotating in the same direction as when feeding in material, the rotation and return movement of the screw piston being adjusted to the pitch s of the screw piston, so that the piston is screwed out from the forward section of the input chamber and returned to its initial position. This return movement of the piston means that the material which may still be present in the rear portion of the chamber is not subjected to any mobile action by the screw piston, and there is no risk that material remaining in the chamber be returned and possibly compacted when the screw piston is retracted.

The internal wall of the input chamber 1 and adjacent portion of its elongated section 6 is provided with a plurality of axial grooves 14 which extend to a point adjacent the outlet of the chamber. These grooves have a double object, viz., on the one hand, to receive guide keys 15 on the guide piston 7, as shown in greater detail in FIG. 2 and FIG. 3 and, on the other hand, to prevent the material fed in from rotating while the screw piston is moving in the chamber 1. The fact is that such a rotation would cause friction losses at the internal wall of the chamber and could bring with it that the material is returned and possibly compacted in a direction rearwards when the screw piston is screwed back to its starting position.

On the exit side of the output valve 4 a pressure tube 19 is connected to the receiving space 5. The pressure tube continues by way of a conduit, not shown, to a pressurized collecting tank for accomodating the material discharged from the apparatus. The through-put area of the pressure tube 19 after the output valve 4 corresponds initially to the through-put area of the receiving space 5 but is increased successively, that is, the pressure tube diverges to an increased diameter in the direction of exit. Thanks to the increasing cross section of the tube the compacted and, to a certain extent, elastic material plug is allowed to expand to assume a somewhat looser structural character, which is desirable for the following treatment of the material, for example, its coming gasification. Furthermore, the expanding pressure tube facilitates the feeding out of the material plug and prevents the same from being returned against the direction of feed, should a pressure difference occur in the feeding out channel during retraction of the screw piston, as described in greater detail below. In order to render return of the material plug against the direction of feed even more difficult, the internal wall of the expanding pressure tube is provided with a saw-toothed or serrated profile 20, as shown in FIG. 4. Then the teeth of the profile have such a form that they prevent the material plug from being returned but not from being fed out.

The arrangement operates in the following way.

In the starting position the cylinder valve 16 is moved to its open position by being displaced to the right, as viewed in FIG. 1, by means of the hydraulic cylinder 18. The inlet 3 of the input chamber is thus freed. The screw piston 2 is retracted leftwards by means of the hydraulic cylinder 11, so that its left portion is located opposite the charge bin 21, now open. The output valve 4 is closed.

Material 22 is supplied from charging bin 21 and flows downwards by gravity towards the screw piston, where it will fill out the free space between the threads of the screw piston. The screw piston 2 is rotated by means of the mechanism 12 in such a direction that the material 22, while being continuously fed in through the inlet 3, is moved rightwards in the input chamber 1, there to form a compacted plug in the receiving space 5 of the chamber. When the input chamber 1 with its receiving space 5 is filled with material the cylinder valve 16 is moved to the left by means of the hydraulic cylinder 18 and closes the inlet 3. The sharpened edge 17 of the cylinder valve cuts through or pushes away those elements of the material which are dwelling in the cross section of the inlet proper.

The rotation of the screw piston 2 is terminated and the output valve 4 is opened. By means of the pressure piston 10 in the hydraulic cylinder 22 the screw piston is moved to the right until its forward end is located a short distance ahead of the through-put area of the output valve 4, thereby discharging the material plug formed into the pressure tube 19. This operation takes place while overcoming friction forces appearing during the feeding out, which are caused by friction exercised by the material plug discharged and by possible further material plugs in the pressure tubes and in the following manifold conduit. This is thus material at this elevated pressure in the through-put area of the output valve, which has the form of a slide gate. To decrease this pressure and facilitate closing of the slide gate 4, the screw piston 2 is retracted a short distance, after which the gate valve 4 is closed. The material plug already discharged is effectively prevented from excercising any friction against the valve slide, as the plug is, in fact, retained against retraction by the serrated, diverging internal wall of the pressure tube.

Upon closing of the output valve 4, the screw piston 2 is returned to its starting position. This takes place while the screw piston is rotated in the same direction as when feeding in material from the charging bin. Here retraction of the screw piston is adjusted in relation to its pitch 3, so that the piston is screwed out from the input chamber 1 and its space 5, respectively, while material remaining between the threads of the screw piston is prevented by the axial grooves 14 from participating in the rotation of the screw piston and is thus not returned against the general direction of feed.

After returning the screw piston to its starting position the cylinder valve 16 is opened by means of the hydraulic cylinder 18, and the above described process is repeated.

It is also possible to form the compacted material plug in several steps and to then discharge these partial plugs in a common discharge step. The axial position of the screw piston in each step of compacting the material plug is adjusted correspondingly. The output valve 4 is maintained closed while the stepwise formed, final material plug is built up. The plug is then discharged in its entirety after the slide valve 4 has been opened, and after the material plug has been discharged the above described procedure is followed. The axial length of the charging bin 21, the screw piston and the input chamber is then adjusted such that material can be supplied while the respective partial plug is formed. Preferably this procedure can be applied when compacting of the material fed in is subject to specified conditions.

I claim:

1. A process for feeding disintegrated material such as wood chips into a collecting container under pressure, the material being transported in a pulsing flow from a charging bin through an input valve to a cylindrical input chamber and discharged axially therefrom through an output valve to the collecting container by means of a feeding piston, comprising the steps of:

a) the material is supplied to the input chamber through the opened input valve by means of feeding piston axially movable in the input chamber, the feeding piston configured as a screw piston with a predetermined pitch, which is located in an axially retracted, receiving position, opposite to the input valve, and which feeds, while rotating in an axially stationary position, the material into the chamber towards the output valve, then closed, b) material is formed as a compacted plug in an exit end of the chamber in front of the output valve, c) the input valve is closed and the rotation of the screw piston terminated, d) the output valve is opened and the material plug formed is pushed, by the screw piston being moved axially, into the collecting container through a slightly expanding pressure tube whose internal wall has serrations serving to prevent return movement of the plug, e) the screw piston is retracted a short distance to permit the closing of the output valve, f) the output valve is closed and the screw piston is pulled back to its starting position while rotating in the same direction as when feeding in material and in correspondence to the pitch of the screw piston, and g) the input valve is opened.

2. A process according to claim 1, characterized in that the screw piston, after having formed a compacted material plug in the input chamber, is retracted to its starting position while rotating in the same direction as when feeding in, whereupon one or more further material plugs are formed in association with the plug at hand and the material plugs thus formed are discharged together into the collecting container.

3. An apparatus for pulsing in-feed of disintegrated material into a container under pressure, comprising:

a screw piston having a preselected pitch and operably positioned within an elongate input chamber defined by a cylindrical interior wall, said screw piston being axially movable in said chamber and having a receiving position at one end of the chamber;

a closable inlet defined in the interior wall opposite the receiving position of the screw piston;

a receiving space located ahead of the receiving position of the screw piston in an opposite end of the chamber that is delimited by a closed output valve;

a longitudinal guideway formed in said interior wall;

a guide piston mounted in the chamber and engaging the guideway for axial movement, and the screw piston having a driveshaft that is rotatably carried within the guide piston; and the screw piston operable to rotate in a first direction to receive material from the inlet, to transport the material axially toward the receiving space and to compact the material within the receiving space, the output valve being openable and the screw piston axially but non-rotatably displaceable through the receiving space to discharge the material through the open output valve.

4. The apparatus according to claim 3, wherein the screw piston is guided in the chamber while having a radial play of 2–10 mm, preferably about 5 mm, between an outer periphery of the screw piston and the interior wall of the chamber.

5. The apparatus according to claim 3, wherein a tubular extension coaxial with the guide piston and rigidly connected thereto is surrounded by a rigidly connected pressure piston component of a double-acting hydraulic cylinder for axial displacement of the guide piston and the screw piston carried thereon, the driveshaft of the screw piston extending freely through said tubular extension, the driveshaft being connected at a free end portion in a non-rotatable and axially floating way to a mechanism for controlling the rotational position of the driveshaft.

6. The apparatus of claim 3, wherein the guideway has at least one axial groove extending along the interior wall, said axial groove receiving a guide key extending from the guide piston, and said axial groove having the further function to prevent the material introduced from rotating under the action of the rotational movement of the screw piston.

7. The apparatus of claim 3, wherein the output valve consists of a slide gate.

8. The apparatus of claim 3, wherein a diverging pressure tube is connected adjacent an outer side of the output valve to transport the compacted material to a collecting container under pressure, the pressure tube having an inside diverging surface, with a saw-tooth or serrated profile extending axially therealong, and having a uni-directing effect to facilitate discharging and prevent return movement of the material.

9. An apparatus for pulsing in-feed of disintegrated material into a container under pressure, comprising:

a screw piston having a preselected pitch and operably positioned within an elongate input chamber defined by a cylindrical interior wall, said screw piston being axially movable in said chamber and having a receiving position at one end of the chamber;

a closable inlet defined in the interior wall opposite the receiving position of the screw position;

a receiving space located ahead of the receiving position of the screw piston in an opposite end of the chamber that is delimited by a closed output valve;

cylinder valve axially displaceable about the input chamber for closing the inlet in the interior wall defining said chamber, the cylinder valve having a circular closing edge forming a knife edge for cutting through material in the inlet; and the screw piston being operable to receive material while rotating in a first direction from the inlet and to transport the material axially toward the receiving space and to compact the material therein, the screw piston further operable to be axially displaced through the receiving space when the output valve is opened to discharge material through the output valve.

10. The apparatus of claim 9, wherein the output valve consists of a slide gate.

11. The apparatus of claim 9, wherein a diverging pressure tube is connected adjacent an outside face of the output valve to transport the compacted material to a collecting container under pressure, the pressure tube having an inside diverging surface, with a saw-tooth or serrated profile extending axially therealong, and having a uni-directing effect to facilitate discharging and prevent return movement of the material.

12. An apparatus for pulsing in-feed of disintegrated material into a container under pressure, comprising:

a screw piston having a preselected pitch and operably positioned within an elongate input chamber defined by an interior wall, said screw piston being axially movable in said chamber and having a receiving position at one end of the chamber;

a closable inlet defined in the interior wall opposite the receiving position of the screw piston;

a receiving space located ahead of the receiving position of the screw piston in an opposite end of the chamber that is delimited by an outlet;

an output valve positioned at the outlet, the output valve driven by a valve actuator to selectively close and open the outlet;

a guide piston mounted in the chamber, the screw piston being rotatably mounted on the guide piston, the guide piston having an axial stroke for axial translation of the guide piston and the screw piston, the guide piston stroke having a length to extend the screw piston through the outlet when the output valve is in an open position; and the screw piston operable to rotate in a first direction to receive material from the inlet, to transport the material axially toward the receiving space and to compact the material within the receiving space against the output valve in a closed position, and the screw piston axially but non-rotatably translatable through the receiving space and through the outlet when the output valve is in the open position to discharge the material through the outlet.

* * * * *